United States Patent
Staack et al.

(10) Patent No.: US 9,228,136 B2
(45) Date of Patent: Jan. 5, 2016

(54) PROCESSING OF DIELECTRIC FLUIDS WITH MOBILE CHARGE CARRIERS

(75) Inventors: David A. Staack, College Station, TX (US); Robert P. Geiger, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 303 days.

(21) Appl. No.: 13/556,739

(22) Filed: Jul. 24, 2012

(65) Prior Publication Data
US 2013/0161232 A1 Jun. 27, 2013

Related U.S. Application Data

(60) Provisional application No. 61/511,297, filed on Jul. 25, 2011.

(51) Int. Cl.
| C10G 32/02 | (2006.01) |
| C10G 15/08 | (2006.01) |
| C10L 1/04 | (2006.01) |
| C10L 1/08 | (2006.01) |
| H01B 3/22 | (2006.01) |

(52) U.S. Cl.
CPC ............... *C10G 15/08* (2013.01); *C10G 32/02* (2013.01); *C10L 1/04* (2013.01); *C10L 1/08* (2013.01); *H01B 3/22* (2013.01); *C10G 2300/1007* (2013.01); *C10G 2300/1011* (2013.01); *C10G 2300/1037* (2013.01); *C10G 2300/1055* (2013.01); *C10G 2300/302* (2013.01); *C10L 2250/084* (2013.01); *C10L 2290/38* (2013.01)

(58) Field of Classification Search
CPC ................................. C10G 15/08; C10G 32/02
See application file for complete search history.

(56) References Cited

U.S. PATENT DOCUMENTS

| 4,223,241 A | 9/1980 | Paszyc |
| 5,332,529 A | 7/1994 | Mead |
| 5,626,726 A * | 5/1997 | Kong ............................. 204/172 |
| 6,284,105 B1 * | 9/2001 | Eliasson et al. ............... 204/165 |
| 2003/0146310 A1 | 8/2003 | Jackson |

FOREIGN PATENT DOCUMENTS

WO          02077194          10/2002

OTHER PUBLICATIONS

International Search Report and Written Opinion from corresponding International Application PCT/US2012/048128, mailed Dec. 26, 2012.
Broekaert, Jose A.C., "Plasma bubbles detect elements", Nature, vol. 455 (2008), pp. 1185-1186.
Ristenpart, W.D. et al., "Non-coalescence of oppositely charged drops", Nature, vol. 461 (2009), pp. 377-380.

* cited by examiner

*Primary Examiner* — Renee E Robinson
(74) *Attorney, Agent, or Firm* — E. Joseph Gess; Melissa M. Hayworth

(57) ABSTRACT

Provided herewith is a novel method of controllably processing a dielectric fluid by creating discharges within the dielectric fluid from mobile charge carriers contained within the dielectric fluid. Generally, the dielectric fluid and the mobile charge carriers are between two electrodes which apply a voltage to the charge carriers. In one embodiment, the dielectric fluid is a hydrocarbon fluid such as a heavy crude oil or a fuel. In one embodiment the charge carrier comprises water droplets. In another embodiment, the mobile charge carriers are metallic balls. In both instances the discharges initiate from the mobile charge carriers.

23 Claims, 4 Drawing Sheets

PROCESSING OF DIELECTRIC FLUIDS WITH MOBILE CHARGE CARRIERS

CROSS-REFERENCE TO RELATED APPLICATIONS

This application claims priority to U.S. Provisional Application No. 61/511,297 filed Jul. 25, 2011, which is incorporated herein by reference in its entirety.

BACKGROUND

1. Field of the Invention

Provided is a method of processing dielectric fluids, particularly hydrocarbon fluids, by discharges created in the fluids through the use of mobile charge carriers. The method can further refine the fluids and/or improve the viscosity and flowability of the fluids.

2. Description of the Prior Art

The dynamics of charged particles in dielectric media has been described by several authors, Melcher, James R. Continuum Electromechanics, Cambridge, Mass.: MIT Press, 1981; and Jones, Thomas B. Electromechanics of Particles, Cambridge University Press 1995. Particle motion in these heterogeneous fluids, where the particles can be either gas, liquid, or solid, can be explained by either electrophoresis, forces on charged particles due to a uniform electric field, dielectrophoresis, or forces on dielectric particles due to a changing field. Although the dynamics of these systems are well known the collisional charge exchange mechanisms between particles have not been fully described. At low electric field, where no discharges occure, some of the processes have only recently been described [W. D. Ristenpart, J. C. Bird, A. Belmonte, F. Dollar & H. A. Stone, "Non-coalescence of oppositely charged drops," Nature 461, 377-380 (2009)]. The prior art has been devoid of a workable understanding of the plasma discharge processes which occur at high electric fields and of a strategy for controlling, and application of the electrical discharges which form when charge carriers collide.

Heavy crude oils are petroleum fuels which do not flow easily. They are classified with an API gravity (API°=141.5/SG -131.5, where SG is the specific gravity of the oil) of less than 20°. There are many subterranean formations containing heavy, i.e., viscous, oils. Such formations are known to exist in the major tar sand deposits of Alberta, Canada and Venezuela, with lesser deposits elsewhere, for example, in California, Utah and Texas. The API gravity of the oils in these deposits typically ranges from 10° to 6° in the Athabasca sands in Canada to even lower values in the San Miguel sands in Texas, indicating that the oil is highly viscous in nature. Typically, crude produced from these areas contain large amounts of water in addition to inorganic contaminants such as salts. The high density and viscosity of these crudes make them difficult to transport. In addition, their processing in conventional refineries is not possible. Hydrotreatment has been used as a method for upgrading heavy oil typically employing chemicals, catalysts, and ultrasound. Such hydrotreating methods are disclosed in U.S. Patents, for example U.S. Pat. Nos. 3,576,737; 7,651,605; 5,824,214 to name a few.

These higher density oils are at a much higher viscosity in comparison to traditional oils. Heavy and extra heavy oils are one grade above bitumen (tar) which does not flow at ambient conditions. While the high density and viscosity of these crudes make them difficult to transport, in addition, their processing requires additional steps to conventional refining, including: heating the oil in excess of 500° C., multiple steps of fractionalization, thermal cracking and hydrotreatment. These processing steps result in a low energy return on energy invested (EROEI) of about 5 (in comparison to ~10 for conventional oils currently and as high as 20 historically). Because of the enormous amounts of heavy oil reserves in the world, but the lack of cost-effective technologies many techniques are being investigated to more effectively upgrade the heavy oils as noted above. A problem of heavy oil is that it takes large amounts of thermal energy and expensive catalysts to upgrade, in addition to the transportation costs. Therefore, new technologies are being sought for several reasons: 1) implementation in the refinery at lower temperatures 2) less sensitivity to oil contaminants 3) implementation prior to transportation, either, down-hole or at the well head rather than in the refinery, as this will lower transportation costs.

Thermal cracking is the process in which long hydrocarbon chains (heavy hydrocarbons) are broken into shorter simpler molecules (light hydrocarbons). It occurs through the breaking of carbon-carbon bonds in the original molecule. Typically this is done with temperature and catalysts. Done in the presence of hydrogen this is called hydrotreating and results in saturated hydrocarbons such as alkanes and naphthenes. Done with steam in short residence time reactors (hydrocracking) this process is used to treat heavier hydrocarbons to produce ethylene, at high temperatures (~900° C.), or liquid hydrocarbons for use in gasoline or fuel oil, at lower temperatures. In cracking various chains of reactions takes place initiated by the formation of a radical as shown in Table 1 for a simple hydrocarbon (though similar processes occur for longer hydrocarbons). A single initiation reaction may feed several additional, decomposition and abstraction reactions before terminating.

TABLE 1

Main Reactions in Hydrocarbon Cracking

| | |
|---|---|
| Initiation | $CH_3CH_3 \rightarrow 2\ CH_3\bullet$ |
| Hydrogen Abstraction | $CH_3\bullet + CH_3CH_3 \rightarrow CH_4 + CH_3CH_2\bullet$ |
| Radical Decomposition | $CH_3CH_2\bullet \rightarrow CH_2{=}CH_2 + H\bullet$ |
| Radical Addition | $CH_3CH_2\bullet + CH_2{=}CH_2 \rightarrow CH_3CH_2CH_2CH_2\bullet$ |
| Termination - Recombination | $CH_3\bullet + CH_3CH_2\bullet \rightarrow CH_3CH_2CH_3$ |
| Termination - Disproportionation | $CH_3CH_2\bullet + CH_3CH_2\bullet \rightarrow CH_2{=}CH_2 + CH_3CH_3$ |

'Non-Thermal' or 'cold plasma' cracking is generally similar to thermal cracking except that the initiation reaction occurs due to impact with a plasma produced species such as an electron, ion, photon, or electrically or vibrationally excited state which is not in equilibrium with the bulk of the matter being treated. The plasma treatment of gaseous hydrocarbons or vaporized liquid fuels is well known. The non-equlibirum nature of the plasma allow for significantly more efficient and rapid chemical reactions than an equilibrium system at similar temperature. Also the chemical reaction pathways in a non-thermal plasma can be more numerous than in a equilibrium system. Significantly less research has been done on the direct upgrading of liquid fuels using non-thermal plasma methods of hydrocarbon cracking. One of the few examples is the work by Kong et al., "Plasma Processing of Hydrocarbons", *Electric Power,* 2009, in which a dielectric barrier discharge was generated in methane over a film of oil for the purpose of upgrading the oil. As shown in their results, the formation of shorter hydrocarbon chains is clearly observable. These results are promising. The economics/efficiencies of the process however are not assessed.

Plasma discharges submerged in liquids are a subset of plasma liquid interactions which more generally include other systems such as discharges near liquid surfaces, discharges in gases with aerosolized droplets and discharges onto a liquid surface. Generally such submerged plasma discharge systems are well known, consisting of electrodes submerged in a liquid, and may either generate a plasma from gas bubble injected into the liquid or through the dielectric breakdown of the liquid potentially with bubble formation but without bubble addition. Generally they consist of discharge between two stationary electrodes connected to an_external circuit. The discharges in such systems are generally very non-uniform and most such systems have very high energy released (on the order of Joules) during the discharge process. Only recent systems employing nanoscale electrode and nanosecond pulsing can achieve mJ energy releases [Nature—News and View: "Analytical Chemistry: Plasma Bubbles Detect Elements", Nature 455, 1185-1186 (30 October 2008)]. Systems using mobile charge carriers rather than connected electrodes to initiate the discharges have not been studied. The prior art is also devoid of strategies for controlling discharge energies to levels an order of magnitude below the mJ level.

It is therefore an object of the present invention to provide an alternative advantageous process for the plasma processing of dielectric fluids, fuels, and especially heavy crude oils, to recover more desirable products.

SUMMARY OF THE INVENTION

Provided herewith is a novel method of controllably processing a dielectric fluid by creating discharges within the dielectric fluid from mobile charge carriers contained within the dielectric fluid. Generally, the dielectric fluid and the mobile charge carriers are between two electrodes which apply a voltage to the charge carriers. In one embodiment, the dielectric fluid is a hydrocarbon fluid such as a heavy crude oil or a fuel. In one embodiment the charge carrier comprises water droplets. In another embodiment, the mobile charge carriers are metallic balls. In both instances the discharges initiate from the mobile charge carriers.

Among other factors, the present invention is based upon the discovery that the use of mobile charge carriers within the dielectric fluid, whether the charge carriers are pre-existing in the fluid or added, and applying an electric field thereto allows one to initiate a chemical reaction within the dielectric fluid in a very controlled manner. The chemical reaction is initiated by plasma discharges enabled by the presence of the mobile charge carriers. The energy released in the plasma discharges are very controllable due to the small and controllable capacitance of the mobile charge carriers, control of the electric circuit, and control of the materials properties of the charge carrier. Controlling the energy release in the discharges allows for control of the state of the plasma and temperature which is generated in the discharge which further allows fine tunability as to the chemical reaction that takes place. The dielectric fluid can therefore be processed in a low temperature process employing highly non-equilibrium discharges.

DETAILED DESCRIPTION OF THE PREFERRED EMBODIMENTS

The present invention employs mobile discharge carriers within a dielectric fluid to create plasma discharges within the dielectric fluid. The discharge creates radicals which initiate a chemical reaction. The type and extent of the chemical reaction can be controlled through the control of the energy release in the discharges. The discharges within the dielectric fluid can be controlled by the types of mobile charge carriers used. The material and size of the carriers will dictate the energy release in the discharges. The capacitance of the mobile charge carriers and the charge transferred to the mobile carrier during collisions helps to control and dictate the energy release.

An important advantage of employing a discharge in the fluid (as opposed to a gas above the fluid or a preexisting bubble within the fluid) is the penetration of the discharge into the volume of the liquid and the generation of radicals in intimate contact with the liquid hydrocarbon. The discharges generated are very small with typical sizes 2 um to 100 um. There is a high surface to volume ratio for the plasma and liquid and the plasma is generated from species present in the liquid. For the discharge in the liquid or fluid, almost every radical generated in the plasma system with the mobile charge carriers interacts with molecules from the liquid phase.

The dielectric fluid can be any dielectric fluid, non-conducting (or poorly conducting) fluid, which can be in need of processing. Generally, the dielectric fluid is a hydrocarbon containing fluid. The hydrocarbon fluid can be a heavy crude oil, gasoline or diesel fuel. The fluid can also be a biofuel liquid or other alternative or non-traditional fuels.

The mobile charge carriers are within the dielectric fluid so that the discharges emanate in the fluid and are distributed throughout the fluid. The mobile charge carriers move within the dielectric fluid, generally bouncing between the two electrodes, or colliding with one another. Discharges are generally initiated upon these collisions.

The size of the mobile charge carriers can vary as needed. Changing the size and shape of the carrier changes the capacitance of the carrier and thus the stored energy on the charge carrier. Carrier size is thus a method to easily control the energy released during the plasma discharge. The mobile charge carriers can comprise metal filings, water bubbles or spherical balls. The metal filings can be any shape, e.g., a cylindrical or of a branched shape. The filings can be made of a metal such as steel, aluminum or brass. The spherical balls can also be made of materials such as steel, aluminum or brass. Also, the spherical balls can be made of a material such as a ceramic material, as long as the material is of a different dielectric constant than the dielectric fluid so it can carry a charge.

Figure 2:
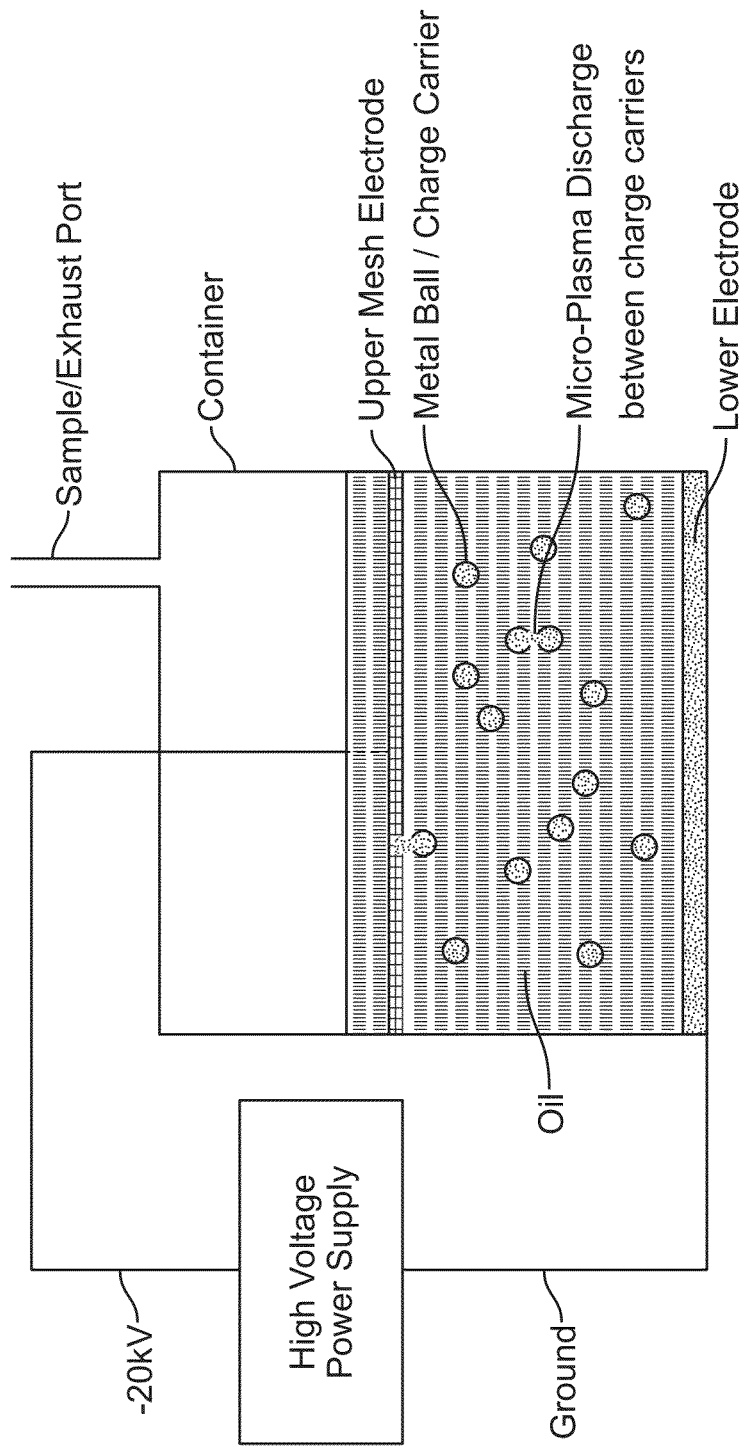
FIG. 2 shows a schematic of an oil treatment reactor.

The dielectric fluid can be processed using a batch reactor as shown in FIG. 2. The dielectric fluid can also flow between two electrodes. The charge carriers can flow with the dielectric fluid, or, the charge carriers can be stationary, between the electrodes, with the dielectric fluid passing over the charge carriers.

Figure 1:
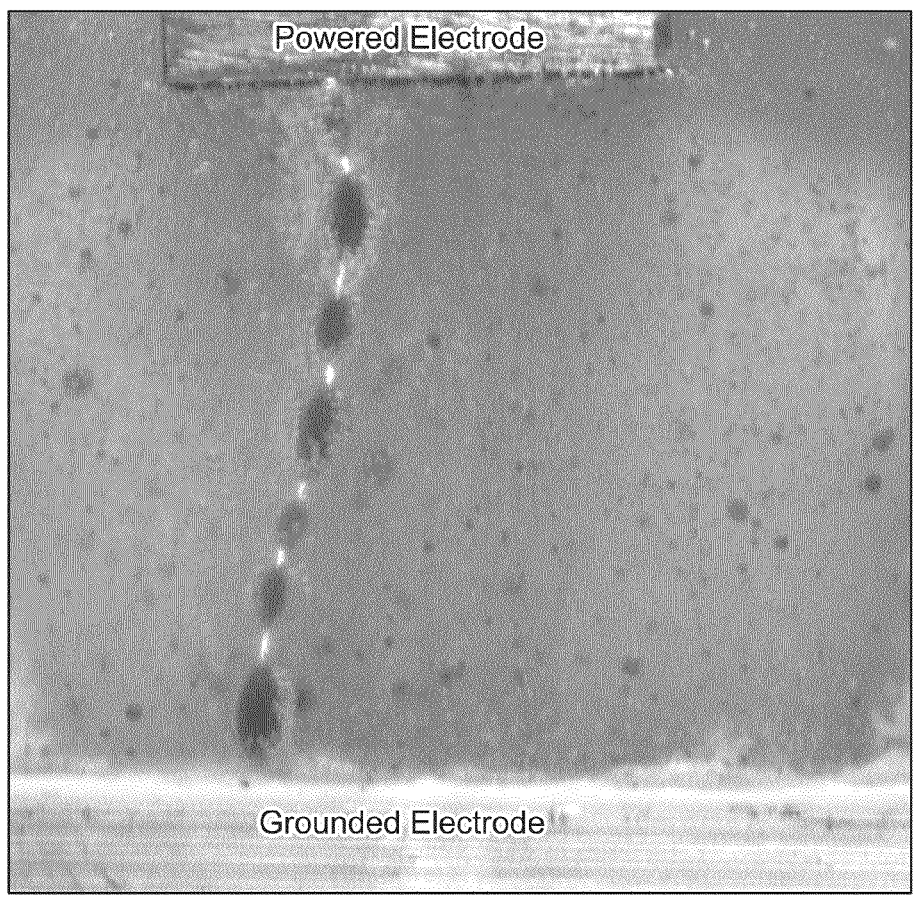
FIG. 1 of the drawing shows an image of plasma discharges between water droplets in oil. Mineral oil and blue dyed water droplets are used for visualization.

In one embodiment of this invention, a water in oil emulsion, is preexisting or created by the addition of water to oil or oil to a water-oil emulsion. The water is an electrolyte with conductivity greater than approximately 0.1 mS/cm. Appropriate conductivity is most likely inherent in the produced oil-water emulsion but could be created by the addition of salts. The water exists as bubbles ranging in size from microscopic (<50 μm) to several millimeters in diameter. The oil-water emulsion is placed between two electrodes and an electric field in the range of 1 to 100 kV/cm is applied. In such conditions the water droplets bounce between the electrodes as charge carriers. At sufficient field the water droplets deform under electrophoretic forces and form sharp microscopic charged surfaces which may generate short duration plasma discharges in between the bubbles and at bubble-electrode interfaces, as shown in FIG. 1. In addition to water droplets other conducting particles or liquids added to or preexisting in the emulsion can act as charge carriers and promote discharges and the chemical and physical treatment of the oil.

Ideally the electrical discharge and processing of the fluid, e.g., oil, can be controlled. The discharge energies can be controlled to levels an order of magnitude below the mJ level. For example, the energy released in the discharge has an energy of between 1 nJ and 10 mJ. In another embodiment the discharge has an energy of 1 μJ and 10 mJ, and in another embodiment an energy between 1 μJ and 100 μJ. In another embodiment the discharge has an energy of between 1 nJ and 1 μJ. Besides the size and capacitance of the charge carriers, there are several other methods to control both the physics and chemistry of the process. For example:

i. External circuit control—The discharge between the charge carriers can be sporadic in nature or occur at a repeatable frequency depending on the geometry of the electrodes and reactor. In both such situations the stored energy on the charge carrier accessible from the external circuit, can cause intense or weak discharges to be generated. Energy stored in capacitors in the external circuit can be released to the charge carriers slowly through ballast resistors and inductors or rapidly. The amount of energy release can similarly be controlled by the size of the external capacitor. The rate of and amount of energy release will affect the temperature, duration, and intensity of the discharge charge, shock waves and light emission. Slow current release was observed to actually form near continuous discharges inside of formed gas bubbles between the charge carriers and electrodes. Faster and lower energy releases lead to nanosecond duration discharges with only on the order of micro-Joules of energy released.

ii. Number or charge carriers and charge carrier interactions—the number of charge carriers will affect whether carrier-electrode or carrier-carrier collision are more prevalent. As each type of collision has a different energy release the predominance of certain chemical pathways over others could be controlled. The multiple charge carriers can also be of various size and material further adjusting the energy release profiles. The mobile charge carriers can be free to interact with one another, as in FIG. 2, or can be individually confined so that there only one charge carrier between each electrode and collisions are only with the electrodes. When free to interact the charge carriers can be controlled to self-organize into chains, as in FIG. 1, or randomly distribute as in FIG. 2.

iii. Additives—chemically reacting species and surfaces can be added to the system for example:

a) Gases can be bubbled through the liquid—for example $H_2$ or $CH_4$ and can act as hydrogen donors to help hydrogenate the hydrocarbons. Gas bubbles are also produced during the discharges.

b) Hydrogen donors can be added to the oil—for example Tetralin has been used as a hydrogen donor. In such processes, the hydrogen donor functions to supply hydrogen to thermally cracked hydrocarbon fragments to thereby reduce coke formation and provide a superior cracked product.

c) Hydrogen donors can be added as water or within the water (for example ammonia ($NH_3$, up to 4%) is easily added to the water and in initial experiments did not change the discharge behavior, yet may provide additional hydrogenation.

d) Acidic solutions—the use of acidic solutions should provide $H^+$ ions for potential reactions in a manner similar to how acidic solid catalyst are used in hydrocracking.

e) Solid particle addition—metallic particle (as in FIG. 2) of various size or metallic catalyst particle (Pt for example) can be mixed in the oil instead of or in addition to water droplet to promote reactions or change the discharge conditions.

Pressure and temperature variations can be employed to effect the desired reaction. The oil may be operated hot to increase the thermal energy available for reactions or at varying pressure to change the equilibrium conditions, rate of chemical reactions, and bubble growth rates.

The following examples are provided to further illustrate the present invention, but are in no manner meant to be limiting.

Example 1

Experiments were performed on the treatment of a Boscan crude oil with a plasma discharge in the liquid to reduce the viscosity of the oil. The Boscan crude was mixed with mineral oil in crude to mineral oil mass fractions of approximately 70% and 30% respectively. Treatments consisting of total input energies in the range of 0 to 20 kJ were performed. Viscosity was measured on treated and untreated samples using a TA instruments AR-2000 rheometer. A portion (3-4 mL) of the sample of the total sample (~25 mL) was removed from the mixture for the viscosity measurement. Both treated and untreated samples were subjected to chemical analysis. The results are shown below.

Summary of Results

Figure 3:
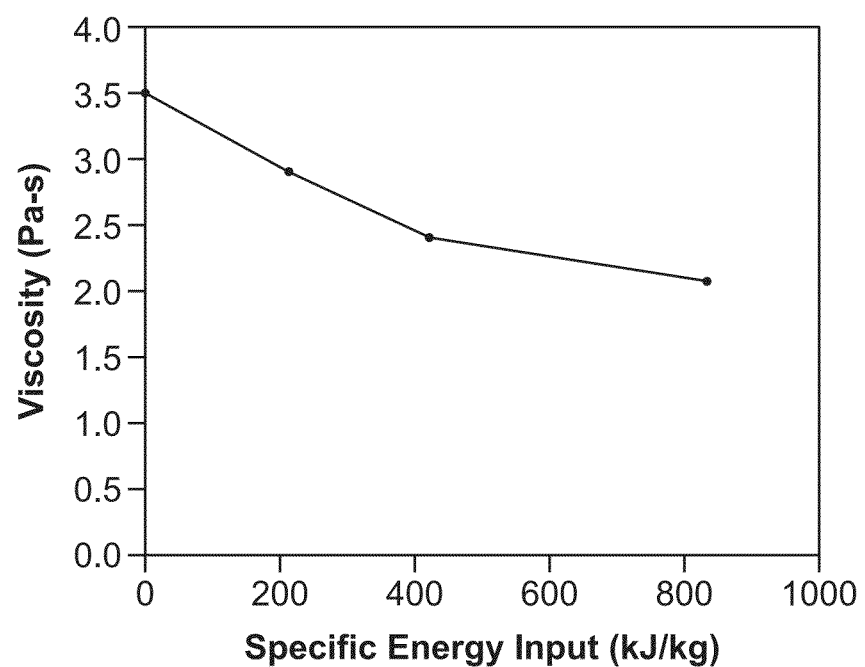
FIG. 3 graphically depicts the viscosity of a treated mixture at 26° C. as a function of various input powers tested.

The Boscan crude was mixed with mineral oil as a diluting agent to reduce the viscosity during treatment and also as a relatively low cost saturated hydrocarbon mixture that can serve as a hydrogen donor. The mixture was approximately a 70%/30% mass ratio (later sim-dist analysis indicates it may be closer to 68.3%, 31.2%) the same large batch mixture was used to for the treated and untreated sample. The untreated mixture had a viscosity of 3.5 Pa·s (3500 cP) at room temperature (26° C.). Three sample volumes of about 25 mL (~24 g) were treated using a plasma discharge process in the oil. Up to 40% reductions in viscosity were measured at the highest energies tested see Table 1. FIG. 3 shows the viscosity reduction as a function of input power.

For chemical analysis a distillation was performed and comparison of the treated and untreated samples shows an increase in light fractions (<500° F. boiling point), and decreases in medium (500-900) and heavy hydrocarbons (900-1300) and a slight increase in residuals for the treated sample. Of the converted heavy and medium fractions 87% were converted to lighter species and only 13% converted to heavier species. Such conversion is consistent with the viscosity measurements.

TABLE 1

Viscosity reductions

| Boscan/<br>Mineral<br>Mass<br>Percentage | Input<br>Energy<br>(kJ) | Sample<br>Mass (g) | Specific<br>Energy<br>Input<br>(kJ/kg) | Viscosity<br>at 26° C.<br>(Pa-s) | Viscosity<br>Change % |
|---|---|---|---|---|---|
| 70%/30% | 0 | 24 | 0 | 3.5 | 0.0% |
| 70%/30% | 5 | 24 | 208 | 2.93 | −16.3% |
| 70%/30% | 10 | 24 | 417 | 2.43 | −30.6% |
| 70%/30% | 20 | 24 | 833 | 2.1 | −40.0% |

Reactor Geometry for Example 1

The reactor used is shown in FIG. 2. An unballasted high voltage power supply applied up to 20 kV across the oil filled discharge gap. The inter electrode spacing is about 2 cm. The metal balls charge when in contact with the electrodes. The metal balls move acting as charge carriers between the electrodes and creating microplasmas when they collide with each other or with the electrodes. Depending on the density of charge carriers in the oil and other conditions various current discharges (5 μA to 5 mA) are possible. Discharges are initiated when conducting particles gain charge at an electrode immersed in the oil and then collide with one another. The electric field between two particles of different charge is sufficient to initiate an electric discharge. The interesting electrodynamics of this system provide a controllable method for the chemically processing of liquids. Three different discharge modes were identified including 1) gas bubble discharges, 2) microspark discharges and 3) spark chain discharges. The microdischarge and spark chains types are shown for water in FIG. 1. The gas bubble charges occur when a high ballast resistance is used and with more viscous fluids and entails the formation of a discharge within a gas bubble between two charge carriers. This occurs because the discharge is stabilized by the ballasting and the gas bubble is more stable due to the high fluid viscosity. The microspark discharges are very short in duration and low in energy and occur between isolated charge carriers during collisions when there is more chaotic particle motion, and for higher electric fields. Lastly spark chains occur when the charged particles self organize into chains and higher energy sparks carry current from one electrode to the other.

Example 2

Experiments were performed on the treatment of JP8, (military diesel fuel) with a bouncing ball, mobile charge carrier, micro-plasma discharge reactor. The gases produced by the reactor were collected and analyzed using gas chromatography (GC). Two different reactor discharge settings were used; case 1: operating at 0.03 mJ/ball-discharge-pulse, and case 2: operating at 0.09 mJ/ball-discharge-pulse. These energies per pulse were controlled by changing the applied voltage to the electrodes, but the same change could also be affected by changing the size of the balls. Table 2 show a analysis of the GC traces of the helium ionization detector (HID) attained for gas sampled from the reactor at the low voltage (low energy per pulse) and high voltage (high energy per pulse) operating conditions. Identified hydrocarbon peaks are labeled 1-8. Using a calibration standard the peaks are identified as 1: hydrogen, 2: methane, 3: overlapping acetylene and ethylene, and 4: ethane. Peaks 5 and 6 are not specifically identified $C_3$s and peaks 7 and 8 are similarly $C_4$s. Lower energy/pulse discharges produced lower concentration of hydrogen and methane while producing relatively higher concentrations of higher hydrocarbons $C_2$, $C_3$ and $C_4$.

By species balance the species produced in the liquid have higher C:H ratio in the high voltage processing and lower C:H ratio in the low voltage processing. These results are clear indications of control of chemical change in the plasma processing of fuels using the herein disclosed invention. Depending on the desired application the more desired product may be either case. Case 1 would be more desirable for hydrogen generation for polymer membrane fuel cells. Case 2 would be more desirable for high energy density compressible fuels for solid oxide fuel cells. Case 2 would be more desirable for the conversion of the JP8 to gasoline.

TABLE 2

Produced Gas Composition Control

| | Peak Area % | | | | | | | |
|---|---|---|---|---|---|---|---|---|
| Condition | 1: H2 | 2: CH4 | 3: C2 | 4: C2 | 5: C3 | 6: C3 | 7: C4 | 8: C4 |
| 10 kV | 6% | 5% | 65% | 3% | 10% | 6% | 3% | 1% |
| 18 kV | 11% | 11% | 61% | 3% | 7% | 4% | 2% | 0% |

Reactor Geometry and Operating Conditions for Example 2

Figure 4:
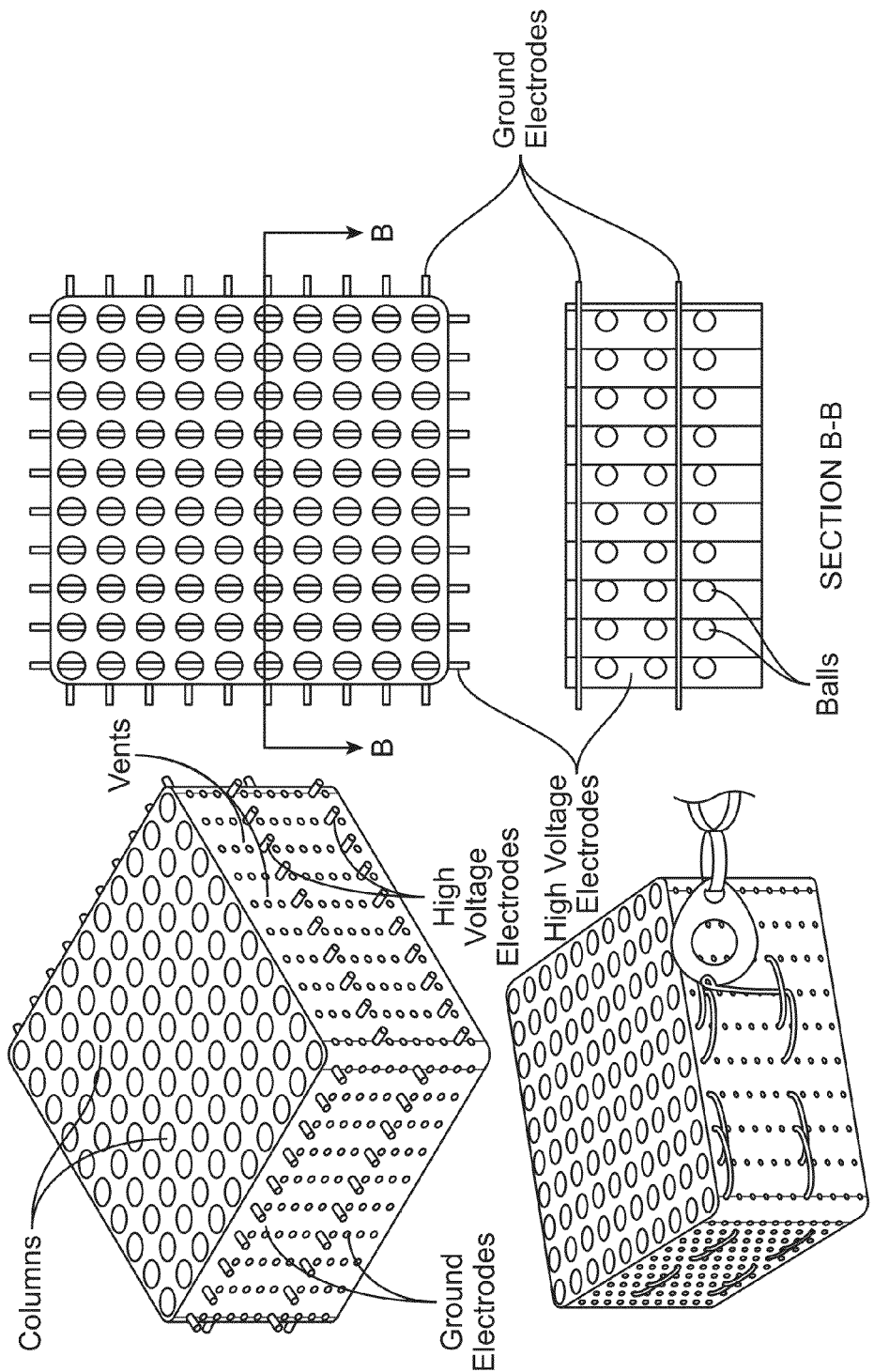
FIG. 4 schematic of another embodiment of an oil treatment reactor

To process larger amounts of fuel in a more controlled manner an embodiment of this technology as shown in FIG. 4 was built. This reactor consisted of 300 bouncing balls between electrodes operated in parallel. In this geometry on charge carrier to electrode collisions are allowed. A detailed CAM drawing and photo of the reactor is shown in FIG. 4. A 10×10 array of vertical columns with intersecting lateral holes for gas venting and electrode feed troughs was fabricated from nylon using a prototyping machine. The electrode wires were alternated vertically giving two ground electrode planes and two high voltage planes and allow for three layers of balls to operate in each column, as shown in FIG. 4. This geometric configuration could be scaled up to every larger scale. The system is operated using a single unballasted DC power supply at voltages between 10 kV and about 18 kV and corresponding currents of 0.05 mA to 0.2 mA. An individual ball would bounce at a frequency of about 60 to 130 Hz over this range. Corresponding discharge energies per microplasma were 28 μJ and 92 μJ per pulse at the low and high voltage operation. The reactor was operated inside of a pressure sealed reaction chamber and immersed in JP8. The gas was sampled for GC analysis.

The present invention, therefore, can provide a low temperature, controllable method of processing, further refining dielectric fluids. Particular applicability can be found with further refining hydrocarbon fluids, which can occur at the wellhead, in the wellbore, or in a refinery. The reactions can involve hydrocracking in order to improve the viscosity and flowability of the fluid.

Various modifications and alterations of this invention will become apparent to those skilled in the art without departing from the scope and spirit of the invention. Other objects and advantages will become apparent to those skilled in the art from a review of the preceding description.

What is claimed is:
1. A method of processing a dielectric fluid comprising:
   providing a dielectric fluid with mobile charge carriers within the dielectric fluid, wherein the dielectric fluid is a hydrocarbon fluid and wherein the mobile charge move within the dielectric fluid and the mobile charge carriers comprise metal filings or spherical balls, wherein the material of the spherical balls is metal or ceramic;

providing the dielectric fluid with the mobile charge carriers within the dielectric fluid between two electrodes; and creating a discharge within the dielectric fluid from the mobile charge carriers within the dielectric fluid, wherein the discharge is created by a collision of the mobile charge carriers with an electrode or with another mobile charge carrier.

2. The method of claim 1, wherein the dielectric fluid with mobile charge carriers within the dielectric fluid is passed between the two electrodes.

3. The method of claim 2, wherein the dielectric fluid is passed between the two electrodes at a flow rate designed to control the discharges at a predetermined energy.

4. The method of claim 2, wherein the size of the mobile charge carriers, the material of the mobile charge carriers, the voltage between the electrodes and the flow rate of the dielectric fluid between the electrodes are all controlled in order to provide discharges within the dielectric fluid at a predetermined energy.

5. The method of claim 4, wherein the mobile charge carriers flow along with the dielectric fluid.

6. The method of claim 1, wherein the hydrocarbon fluid is a heavy crude oil, waste oil, gasoline or diesel fuel.

7. The method of claim 6, wherein the hydrocarbon fluid is a heavy crude oil.

8. The method of claim 1, wherein the hydrocarbon fluid is a biofuel.

9. The method of claim 1, wherein the mobile charge carriers comprise metal filings of a cylindrical or branched shape.

10. The method of claim 9, wherein the material of the metal filings is comprised of steel, aluminum or brass.

11. The method of claim 1, wherein the mobile charge carriers comprise spherical balls.

12. The method of claim 11, wherein the spherical balls are comprised of a ceramic material.

13. The method of claim 11, wherein the spherical balls are comprised of a metallic material which is steel, aluminum or brass.

14. The method of claim 1, wherein the processing of the dielectric fluid improves the viscosity and/or flowability of the dielectric fluid.

15. The method of claim 14, wherein the dielectric fluid is a heavy crude and/or a fuel oil.

16. The method of claim 1, wherein the processing of the dielectric fluid converts proportions of various distillation fractions to lighter hydrocarbons.

17. The method of claim 1, wherein the processing of the dielectric fluid changes the chemical composition of the fluid.

18. The method of claim 17, wherein the parameters of the processing control the C:H ratio of products produced.

19. The method of claim 1, wherein the discharge has an energy of between 1nJ and 10 mJ.

20. The method of claim 19, wherein the discharge has an energy of between 1 µJ and 10 mJ.

21. The method of claim 20, wherein the discharge has an energy of between 1 µJ and 100 µJ.

22. The method of claim 19, wherein the discharge has an energy of between 1 nJ and 1 µJ.

23. A method of processing a dielectric fluid comprising:
providing a dielectric fluid with mobile charge carriers within the dielectric fluid, wherein the mobile charge carriers move within the dielectric fluid, the mobile charge carriers comprise metal filings or spherical balls, wherein the material of the spherical balls is metal or ceramic, and the dielectric fluid is a hydrocarbon fluid; and creating a discharge within the dielectric fluid from the mobile charge carriers within the dielectric fluid to process the dielectric fluid, wherein the discharge has an energy an order of magnitude below the mJ level.

* * * * *